Patented June 11, 1935

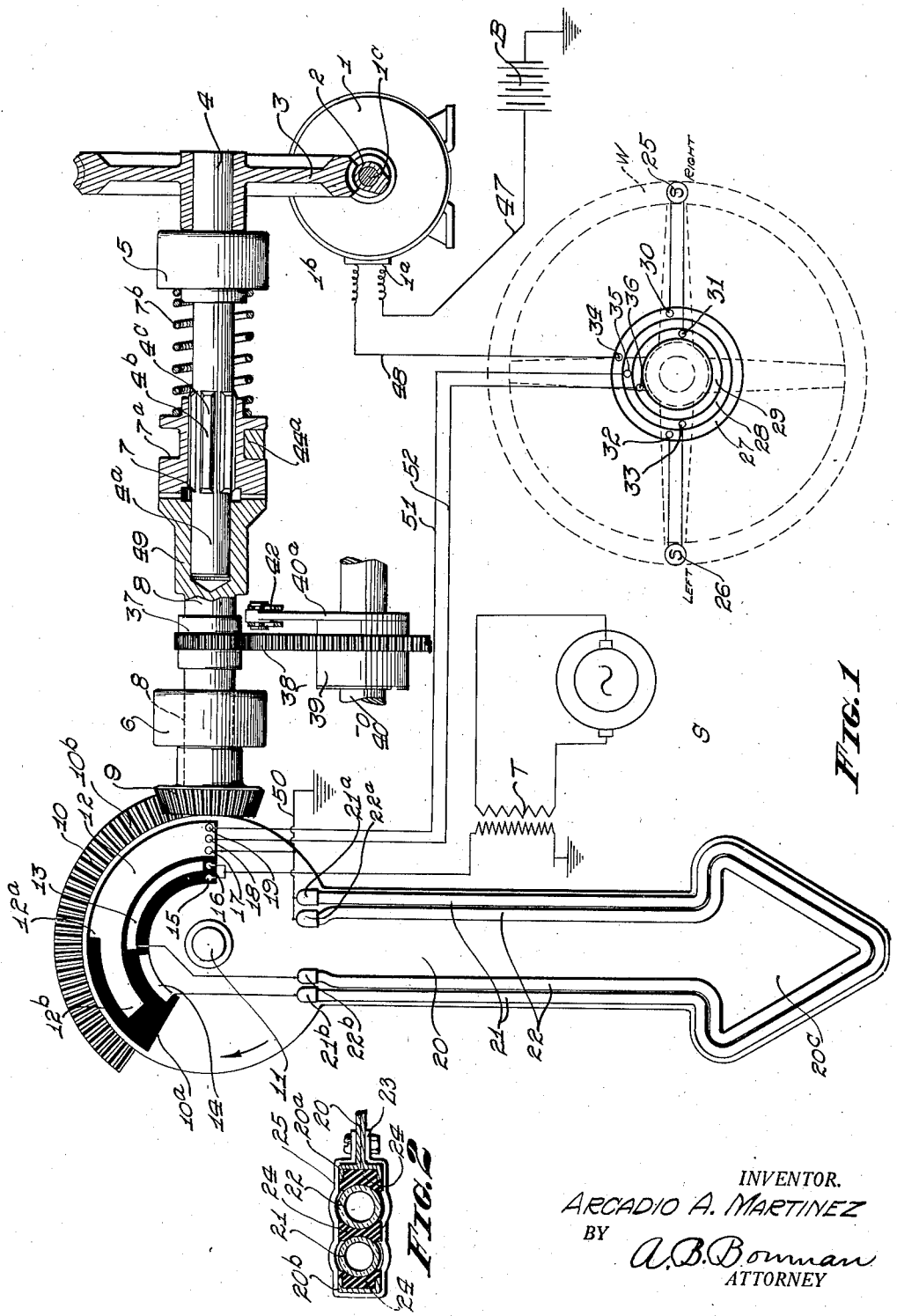

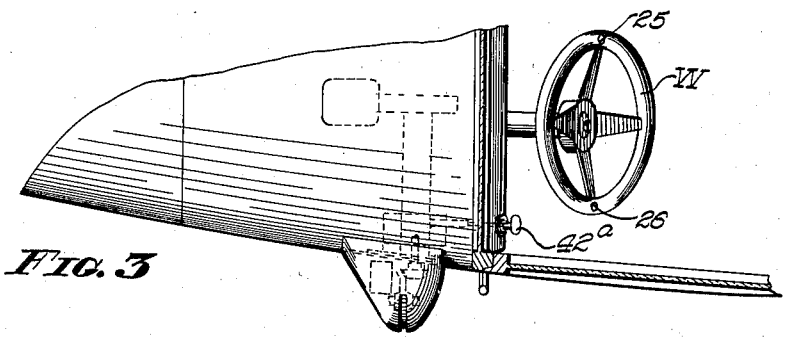
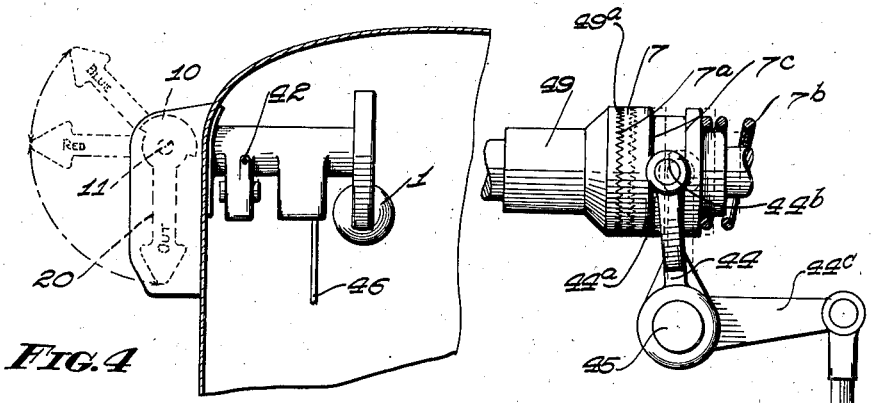
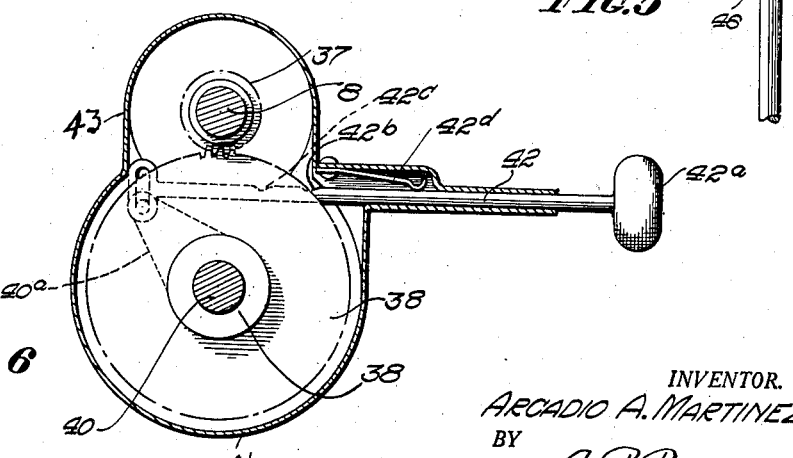

2,004,289

UNITED STATES PATENT OFFICE 2,004,289

VEHICLE DIRECTION SIGNAL

Arcadio A. Martinez, San Diego, Calif.

Application February 4, 1930, Serial No. 425,746

2 Claims. (Cl. 177—327)

My invention relates to vehicle direction signals, and the objects of my invention are:

First, to provide an automobile direction signal which is visible from both the front and rear of the car;

Second, to provide a motor operated automobile direction signal which may be selectively controlled from the steering wheel;

Third, to provide a motor operated signal which automatically stops at the desired indicating position when operated;

Fourth, to provide a motor operated signal including means for causing the signal to assume the neutral position by the force of gravity;

Fifth, to provide a motor driven signal which is operable by manual control on failure of the motor to operate it;

Sixth, to provide a motor driving mechanism for a signal which automatically locks the signal in position after moving it to the desired position;

Seventh, to provide a mechanism which serves as a lock for the signal when the signal is operated by hand;

Eighth, to provide a releasing mechanism for allowing the signal to regain the neutral position;

Ninth, to provide an illuminable signal having distinguishing colors for respective positions to which it is moved and means for selectively connecting said illuminable means;

Tenth, to provide a signal having neon gas tubes forming arrows supported in a manner to prevent accidental breaking and permitting visibility from front and rear; and, Eleventh, to provide a signal which is readily securable to an automobile, and which is efficient in its action, easy to manipulate, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a substantially diagrammatical view of my signal and the operating mechanism and electrical connections associated therewith;

Fig. 2 is a typical cross sectional view of the signal arm, indicating the manner in which the neon tubes are supported thereon; Fig. 3 is a fragmentary plan view of a car, showing the signal mounted thereon; Fig. 4 is a fragmentary transverse sectional view of a car with the signal mounted thereon, and indicating the position of the therewith related driving mechanism; Fig. 5 is an enlarged fragmentary view of the clutch mechanism; and Fig. 6 is an enlarged fragmentary view of the manually operable mechanism for controlling the signal.

The motor 1, worm 2, worm wheel 3, shaft 4, bearings 5 and 6, clutch 7, shaft 8, bevel pinion 9, bevel gear 10, signal arm shaft 11, contact segments 12, 13 and 14, contact brushes 15, 16, 17, 18 and 19, signal arm 20, tubes 21 and 22, brackets 23, cushions 24, push buttons 25 and 26, collector rings 27, 28 and 29, contacts 30 to 36, inclusive, pinions 37, gear 38, bearing 39, shaft 40, casing 41, rod 42, housing 43, rocker 44, shaft 45, and rod 46 form the principal parts and portions of my novel automobile signal.

Referring now to Fig. 1 of the drawings, a direct current motor 1 of conventional structure is connected at its one terminal 1a by means of a conductor 47 with the ungrounded terminal of the vehicle battery B, the other terminal of which is grounded in the usual manner to the frame of the vehicle. The second terminal 1b of the motor is connected by means of a conductor 48 to a collector ring 27 for a purpose hereinafter more fully set forth.

A worm 2 is provided on the motor shaft 1c, and is adapted to drive a worm wheel 3 suitably mounted on a shaft 4 journalled in a bearing 5. On a portion 4b of the shaft 4 is mounted a sliding clutch member 7, which is adapted to engage a second clutch member 49 rigidly secured to a second shaft 8, mounted in axial alinement with the shaft 4. The clutch members 7 and 49 are preferably of the claw type, having serrated interlocking faces 7a and 49a, whereby rotary movement may be imparted to the shaft 8 on rotation of shaft 4.

The coupling member 49 is bored axially to receive the outer end portion 4a of shaft 4 while the portion 4b thereof on which the clutch 7 is mounted is provided with axially extending key members 4c, which may be in the form of integral splines, the clutch 7 being provided with corresponding longitudinally extending slots into which the key members 4b extend.

The shaft 8 is suitably mounted in a bearing 6 by means of which it is held in accurate alinement with shaft 4. At the end of the shaft 8 opposite to that on which the clutch member 49 is mounted is provided a bevel gear 9, which is adapted to engage the segmental bevel gear 10 mounted on a shaft 11 extending at right angles to the shaft 8. The segmental gear 10 is preferably formed on the marginal portions of a circular plate 10a which is rigidly mounted on the shaft 11.

On the upper face of plate 10a is secured a segmental insulating plate 10b mounted concentric with the axis of shaft 11. To said insulating plate are secured the contact segments 12, 13 and 14 in spaced, offset relation, as clearly shown in Fig. 1. Segment 12 extends over an arc of slightly less than 145 degrees and has a step 12a at a point slightly less than 90 degrees from its one end, forming a reduced end portion 12b. Segment 13 is positioned inwardly of segment 12 adjacent the wide portion thereof, while segment 14 is positioned inwardly of the portion 12b being also inwardly offset relative to segment 13.

Mounted on a suitable stationary support, not shown, are the contacting brushes 15, 16, 17, 18 and 19, shown diagrammatically in Fig. 1 on a line substantially radial to the axis of the plate 10a.

From the plate 10a, forming preferably an integral part thereof, extends the signal arm 20, having an arrow head shaped end portion 20c. The vertical position shown in Fig. 1 corresponds to the neutral position of the signal, and it should be noted that the contact brushes are then at the extreme end of the contact segments.

As illustrated in Fig. 2, a substantially U-shaped channel portion 20a is formed along the margin of the arm 20, and a corresponding bent U-shaped channel member 20b is supported thereon in parallel spaced relation by means of the brackets 23, which are bolted or otherwise secured to the arm 20. Intermediate the channel portions 20a and 20b are mounted a pair of illuminable gas tubes, 21 and 22, such as neon tubes, formed to represent the outline of an arrow.

The tube 22 fits closely within the tube 21 when mounted in position.

Between the tubes and on their outer sides are provided cushion members 24, preferably of some soft, resilient substance such as rubber. These members are held in position by means of the channel member portion 20a and channel member 20b, and brackets 23, as clearly illustrated in Fig. 2.

The end terminals 21a and 22a of the tubes 21 and 22 respectively, are grounded by means of a conductor 50, while the terminals 21b and 22b are connected, respectively, with the segments 14 and 13. The brush members 15 and 16 which are adapted to engage the segments 14 and 13, respectively, are connected with the one terminal of a high tension transformer T, which is adapted to be supplied by means of a suitable electric current from a source of supply S.

Referring now to the contact segments, it will be noted that the segment 13 extends substantially over an arc of ninety degrees, while segment 14 extends in offset relation to a continuation of said arc for a further forty-five degrees. Thus when the arm 20 is swung upwardly, contact brush 16 engages segment 13 during a movement up to an angle of ninety degrees from the vertical, while a further movement will cause brush 16 to become disengaged and brush 15 to engage segment 14 and remain in contact therewith until the arm has reached an angle of forty-five degrees above the horizontal, that is, a total movement of substantially one hundred and thirty-five degrees.

The large segment 12 which is adapted to be engaged by brushes 17, 18 and 19, is formed so as to engage all three brushes over a movement of slightly less than ninety degrees, while over a further movement of slightly less than forty-five degrees, brushes 17 and 18 retain contact with the stepped portion 12b while brush 19 breaks contact with the segment.

It will be noted further that when the arm occupies the vertically downwardly extending position, the brush 16, as well as brush 15, rests on the insulation 10a, while brushes 17, 18, and 19 remain in contact with segment 12. Brush 18 is connected by means of a conductor 52 to a collector ring 29, while brush 19 is connected by means of conductor 51 to the collector ring 27.

It will be here noted that these collector rings are suitably mounted on a plate positioned on the steering wheel of the vehicle, and while they are shown as concentric rings, it is obvious that they may be formed of rings of equal diameter and positioned on a drum surrounding the steering column and movable therewith.

On opposite sides of the steering wheel rim is mounted a pair of push button switches 25 and 26, which are connected, respectively, to rings 29 and 27, in the case of switch 25, and rings 28 and 27 in the case of switch 26, said connection being made by suitable stationary contact members 30, 31, 32 and 33.

The conductors 48, 51 and 52 are likewise connected by means of suitable contact members 34, 35 and 36, with the rings.

Brush 17 is grounded, thereby permanently grounding segment 12.

The circuits by means of which the motor is operated can now be described.

Closing, for example, switch 25 will cause current to flow from the battery to the motor by way of conductor 47, and from the motor by conductor 48 and contacts 34 to rings 27, thence through switch 25 to rings 29, then by way of contact member 36 to conductor 52, and brush 18, to segment 12, thence to brush 17, and back to ground, thus closing the motor circuit. The motor will then rotate and cause the arm 20 to be moved upwardly, this movement continuing until the brush 19 leaves the segment at the stepped portion 12a. This causes the circuit to the motor to be interrupted and the arm 20 will have reached a substantially horizontal position.

As soon as the disk 10a rotates, the brush 16 completes the contact with segment 13 and as segment 13 is connected to tube 22, while brush 17 is connected to the transformer T, tube 22 will be illuminated, and will remain illuminated after the arm has reached the horizontal position, and the motor is disconnected, since the segment 13 extends slightly beyond the stepped portion 12a of segment 12, and brush 16 remains in contact with the segment 13. When brought to this position, the arm 20 indicates that the vehicle is about to be turned to the left, and this feature is emphasized by using for the tube 22 one giving a red light, the signal thus becoming very conspicuous at night time, and owing to the structure of the signal arm the tube 22 is visible from both front and rear.

When it is desired to make a right hand turn, the push button 26 is actuated. This causes a circuit through the motor by way of the conductor 51, and brush 19, causing upward movement of the arm to continue until the brush 18 passes over the extreme end of the segment portion 12b in which position the arm will extend at an angle substantially forty-five degrees above the horizontal.

During the first ninety degrees of the upward movement, brush 17 will be in engagement with segment 13, and the inner tube 22 will be illuminated. From this point on brush 17 will leave segment 13 while brush 16 comes into engagement with segment 14.

The brush 16 will remain in contact with segment 14 after the arm reaches its uppermost position, and tubes 21 will be illuminated until such time as the arm 20 is lowered.

In order to more clearly distinguish the signals at night time, I prefer to use a tube 21 giving a different color light than that given by tube 22, such as a green or blue light.

The manner in which the arm 20 is held in its extended position after the motor has become disconnected, and the manner in which it is lowered, will now be explained.

Since the worm 2 used in connection with the mechanism is a single thread worm, the friction is sufficient to cause the mechanism to bind when operated from the signal end thereof. Thus, the tendency of the signal arm 20 to rotate the shafts 8 and 4 respectively, in the opposite direction, due to the force of gravity, is effectively prevented by the binding action of the worm wheel 3 against the worm 2, and the arm 20 will remain indefinitely in the position to which it has been moved until such time as the clutch member 7 is withdrawn from the clutch member 49. Provision for this action is made by connecting a suitable actuating member 44, which is pivotally supported on a bearing 45, with the clutch member 7. The latter is provided with an annular groove 7c in which a yoke member 44a is adapted to be positioned, said yoke member being pivotally connected with the rocker 44 by means of the pin 44b extending outwardly from the yoke member. The rocker 44 is provided with an arm 44c, to which is pivotally connected an actuating rod 46, which may be foot operated by means of a suitable pedal not shown, or in any other manner, so as to cause the rocker 44 to be swung around the shaft 45, whereby the clutch member 49 is disengaged from clutch member 7. This permits the arm 20 to fall down to its lowest position, after which the force on the rocker 44 may be withdrawn. Clutch 7 then moves into engagement with clutch 49 by the action of spring 7b. The latter, as may be clearly seen in Fig. 1, bears against clutch member 7 and bearing 5, suitable bushings being provided for receiving the end convolutions of the spring.

In the event of the failure of the motor to operate properly, I provide a hand operated mechanism for actuating the signal arm. This mechanism comprises a gear member 37 mounted on the shaft 8 preferably adjacent the clutch member 49, and in mesh with a second gear 38 mounted on a suitably supported shaft 40. A lever 40a is mounted on said shaft, and is connected by means of a rod 42, the other end of which is provided with a knob 42a or any other suitable grip means and placed in a position readily grasped by the hand of the driver. The rod 42 is provided with a pair of spaced apart indents 42b and 42c, corresponding to the two operating positions of the signal arm. A suitable resilient catch 42d is provided on the casing 41 which encloses the gears 37 and 38. The catch 42d enters the indents 42b and 42c and thereby indicates the proper position of the signal arm.

When using the manual operated means for moving the signal arm, it is necessary at the same time to disengage the clutch members, while by reengaging them the arm will be held in the signalling position until such time as the clutches are again disengaged.

It is thus obvious that the worm and gear form the necessary locking means for retaining the arm in its proper position whether operated manually or by means of the motor.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a signal arm operating mechanism, a motor, electric connections therefor, a shaft, worm and gear means connecting said motor to said shaft, a second shaft, clutch means connecting said shafts, a pivotally mounted signal arm, means connecting said second shaft to said signal arm, electric contacting means controlled by movement of said arm for initially making and subsequently breaking the electrical connections of said motor on predetermined movement of said signal, said worm and gear forming a frictional retaining means for holding said arm in adjusted position, and manually operable means for releasing said clutch for allowing said arm to regain its initial position.

2. In a signal arm operating mechanism, a motor, electric connections therefor, a shaft, worm and gear means connecting said motor to said shaft, second shaft, clutch means connecting said shafts, a pivotally mounted signal arm means connecting said second shaft to said signal arm, electric contacting means controlled by movement of said arm for initially making and subsequently breaking the electrical connections of said motor on predetermined movement of said signal, said worm and gear means forming a frictional retaining means for holding said arm in adjusted position.

ARCADIO A. MARTINEZ.